US010297250B1

(12) United States Patent
Blanksteen et al.

(10) Patent No.: US 10,297,250 B1
(45) Date of Patent: May 21, 2019

(54) ASYNCHRONOUS TRANSFER OF AUDIO DATA

(71) Applicant: Amazon Technologies, Inc., Seattle, WA (US)

(72) Inventors: Scott Ian Blanksteen, Issaquah, WA (US); Nikko Strom, Kirkland, WA (US); Kavitha Velusamy, San Jose, CA (US); Tony David, San Jose, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1218 days.

(21) Appl. No.: 13/792,505

(22) Filed: Mar. 11, 2013

(51) Int. Cl.
*G10L 21/02* (2013.01)
*G10L 15/20* (2006.01)

(52) U.S. Cl.
CPC ............. *G10L 15/20* (2013.01); *G10L 21/02* (2013.01)

(58) Field of Classification Search
None
See application file for complete search history.

(56) References Cited

U.S. PATENT DOCUMENTS

| | | | | |
|---|---|---|---|---|
| 5,606,644 A | * | 2/1997 | Chou .................... | G10L 15/063 704/243 |
| 6,188,876 B1 | * | 2/2001 | Kim ...................... | H04W 24/00 370/241 |
| 6,522,726 B1 | * | 2/2003 | Hunt ..................... | G10L 15/22 379/88.04 |
| 7,418,392 B1 | | 8/2008 | Mozer et al. | |
| 7,720,683 B1 | | 5/2010 | Vermeulen et al. | |
| 7,774,204 B2 | | 8/2010 | Mozer et al. | |
| 2002/0143551 A1 | * | 10/2002 | Sharma ................ | G10L 15/30 704/270.1 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Richa Mishra
(74) *Attorney, Agent, or Firm* — Lee & Hayes, P.C.

(57) ABSTRACT

The systems, devices, and processes described herein may asynchronously transfer audio signals from a voice-controlled device to a remote device. The audio signals may correspond to sound that is captured by multiple microphones of the voice-controlled device, which may then process the audio signals. The audio signals may also be transferred to the remote device for processing. Moreover, a determination of whether the voice-controlled device or the remote device is to process the audio signals may be based at least in part on the bandwidth of a network communicatively coupled to the voice-controlled device. The voice-controlled device may also cache and log the audio signals, and then asynchronously stream the audio signals to the remote device after the audio signals are initially processed, which may be based on the bandwidth of the network. The remote device may utilize the unprocessed audio signals to improve subsequent processing of audio signals.

25 Claims, 6 Drawing Sheets

(56) References Cited

U.S. PATENT DOCUMENTS

| | | | | |
|---|---|---|---|---|
| 2004/0136549 | A1* | 7/2004 | Pennock | G10H 1/02 |
| | | | | 381/119 |
| 2011/0255702 | A1* | 10/2011 | Jensen | G01H 7/00 |
| | | | | 381/66 |
| 2012/0223885 | A1 | 9/2012 | Perez | |
| 2012/0253799 | A1* | 10/2012 | Bangalore | G10L 15/183 |
| | | | | 704/231 |
| 2013/0136089 | A1* | 5/2013 | Gillett | H04W 72/048 |
| | | | | 370/329 |
| 2013/0325449 | A1* | 12/2013 | Levien | G10L 15/30 |
| | | | | 704/201 |

* cited by examiner

ASYNCHRONOUS TRANSFER OF AUDIO DATA

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

When interacting with a device through speech, a device may perform automatic speech recognition (ASR) on audio signals generated from sound captured within an environment for the purpose of identifying voice commands within the signals. However, the device may have insufficient resources (e.g., memory, central processing unit (CPU) availability, etc.) in order to process the audio signals. In addition, if the device or a network associated with the device has a limited amount of bandwidth, it may be difficult to transmit the captured audio to a remote device that has sufficient resources to process the corresponding audio signals.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
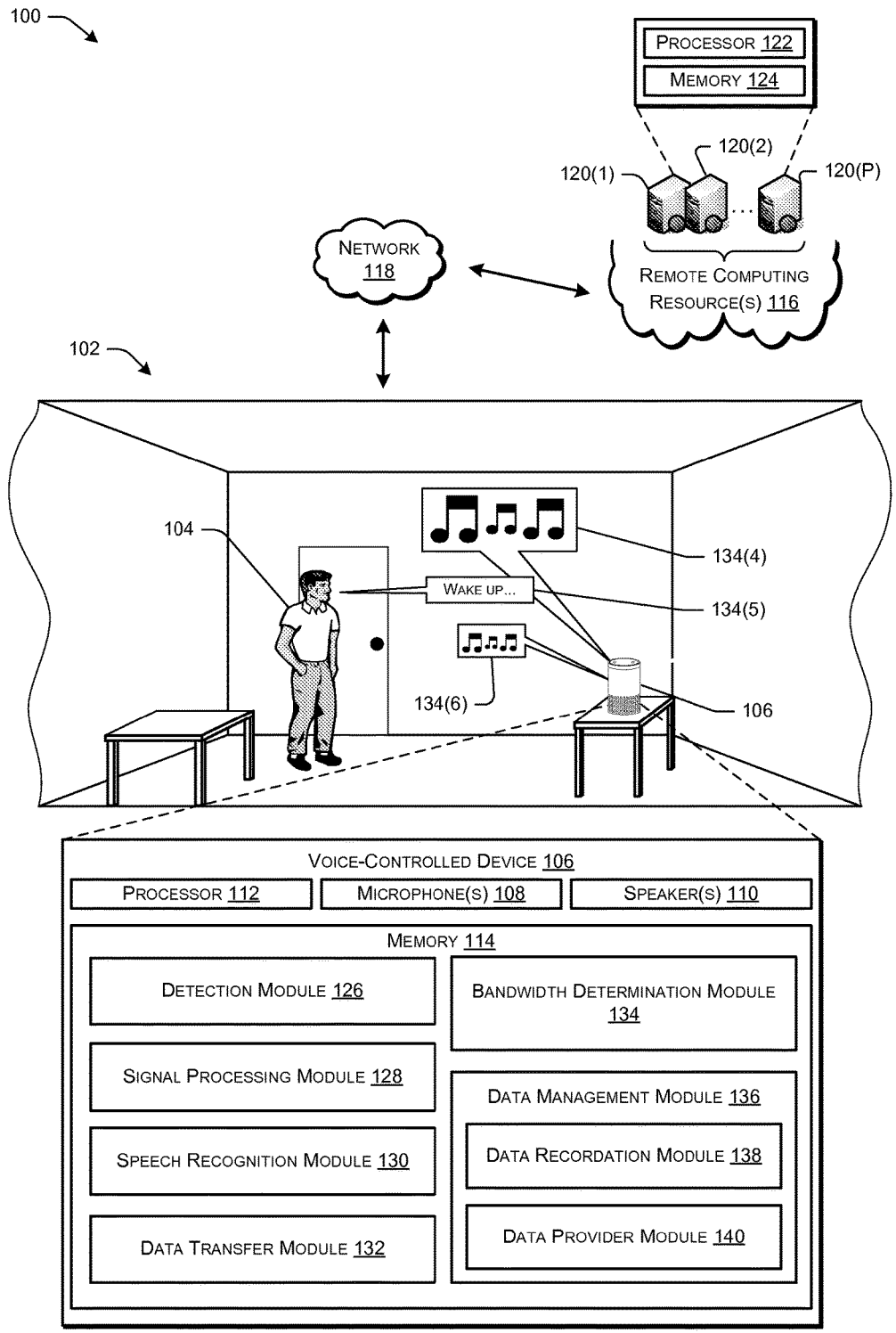
FIG. 1 shows an illustrative voice interaction computing architecture having a voice-controlled device physically situated in an environment, along with one or more users who may wish to provide a command to the device, connected to remote computing resources via a network.

The systems, devices, and/or processes described herein are directed to processing an audio signal that corresponds to audio (e.g., sound) captured within a physical space (e.g., an environment, a room, etc.). More particularly, a device (e.g., a voice-controlled device) within the physical space, a second device remote from the device (e.g., a server), or a combination of the two, may process the audio signal and then determine one or more words that are represented within the audio signal. Such processing may include selecting a beam that corresponds to a voice captured within the physical space (i.e., beamforming), reducing the amount of echo associated with the audio signal (i.e., echo cancellation), and/or reducing the amount of noise associated with the audio signal (i.e., noise reduction). The device and/or the remote device may perform automated speech recognition ("ASR") with respect to the processed (or cleaned) audio signal for the purpose of identifying one or more words that are represented within the audio signal. The unprocessed audio signals may also be subsequently utilized to improve the processing of audio signals and/or to improve the accuracy of the ASR, such as by modifying, selecting, or deselecting existing algorithms and/or developing new algorithms.

Various speech or voice detection techniques may be utilized by devices within a physical space to detect, process, and determine one or more words uttered by a user. However, existing devices may not have sufficient resources (e.g. memory, CPU, etc.) in order to efficiently and accurately process audio signals that correspond to audio captured within the physical space. Therefore, in response to detecting a user utterance, the device may be unable to quickly process the audio signals and then further be unable to perform an operation that corresponds to the user utterance. In addition, there may be insufficient bandwidth to stream or transmit, in real-time or near real-time, the unprocessed audio signals to remote devices that may have additional resources, capacity, or availability to process the audio signals.

In some embodiments, the device within the physical space may detect and capture audio within the physical space and then process one or more audio signals that correspond to the captured audio. In particular, provided that the device contains multiple microphones that each capture the audio and, thus, are associated with a different beam, the device may select the beam that best represents, or most clearly reproduces, the voice of a user within the physical space (also referred to herein as "beamforming"). The device may then reduce the amount of echo (e.g., acoustic echo) associated with the audio signal (also referred to herein as "echo cancellation" or "acoustic echo cancellation"). Moreover, the device may reduce the amount of noise (e.g., background noise, other voices, etc.) associated with the audio signal (also referred to herein as "noise reduction"). The device may then perform speech recognition (e.g., ASR) with respect to the audio signal, such as by determining one or more words that are represented within the audio signal. In other embodiments, the processed audio signal may be provided to (e.g., transmitted, streamed, etc.) to a remote device that may perform the speech recognition.

In other embodiments, in response to the device capturing the audio, the unprocessed audio signal may be provided to the remote device. The remote device may then perform beamforming, echo cancellation, noise reduction, and/or speech recognition with respect to the audio signal. In various embodiments, the remote device may have additional resources, bandwidth, etc., which may allow the remote device to process the audio signal more accurately and more efficiently.

Furthermore, a determination of whether the device or the remote device is to process an audio signal may be based at least in part on a current bandwidth of a network that is communicatively coupled to the device. That is, the systems and processes described herein may determine the bandwidth of the network and then determine if the device is to process the unprocessed audio signal, or if the unprocessed audio signal should be provided to the remote device so that the remote device may process the audio signal. This determination may be based at least in part on whether the bandwidth is less than or greater than a certain bandwidth threshold.

In various embodiments, the device may process the audio signal and/or perform speech recognition with respect to the audio signal. Alternatively, the device may provide the processed audio signal to the remote device, which may then determine one or more words that are represented within the audio signal. In addition, the unprocessed audio signal may be provided (e.g., sent, streamed, transmitted, etc.) to the remote device in an asynchronous manner, meaning that the audio data may be sent from the device to the remote device after the audio signal is processed. For instance, after audio signal is processed in some way (e.g., noise reduction, acoustic echo cancellation, etc.), a processed version (e.g., a first version) of the audio signal may be sent to the remote device. At a subsequent time, the raw audio signal, which may correspond to a lesser or differently processed version of the same audio signal (e.g., a second version of the audio signal) may be sent to the remote device. As a result, the processed version of the audio signal and a lesser processed version of the audio signal may be provided to the remote device asynchronously, meaning that the two versions of the audio signal are provided to the remote device at different times.

The unprocessed audio signal may be provided to the remote device at a rate that is dependent upon the bandwidth of a network used to upload audio signals to the remote device. The remote device may utilize the unprocessed audio signals to enhance or select, deselect, or modify algorithms utilized to process audio signals, or to develop new algorithms that may allow audio signals to be processed in a more efficient or accurate manner.

Accordingly, the systems and processes described herein relate to a more practical and effective process for processing an audio signal that corresponds to audio captured within a physical space, as will be discussed in additional detail below. The devices and techniques described above and below may be implemented in a variety of different architectures and contexts. One non-limiting and illustrative implementation is described below.

FIG. 1 shows an illustrative voice interaction computing architecture 100 set in an environment 102, such as a home environment 102, that includes a user 104. The architecture 100 also includes an electronic voice-controlled device 106 (interchangeably referred to as "device 106") with which the user 104 may interact. In the illustrated implementation, the voice-controlled device 106 is positioned on a table within a room of the environment 102. In other implementations, it may be placed in any number of locations (e.g., ceiling, wall, in a lamp, beneath a table, under a chair, etc.). Further, more than one device 106 may be positioned in a single room, or one device 106 may be used to accommodate user interactions from more than one room.

Generally, the voice-controlled device 106 may have a microphone unit that includes at least one microphone 108 (and potentially multiple microphones 108) and a speaker unit that includes at least one speaker 110 to facilitate audio interactions with the user 104 and/or other users 104. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 2.

The microphone(s) 108 of the voice-controlled device 106 may detect and capture audio from the environment 102, such as sounds uttered from the user 104, other noise within the environment 102, and/or acoustic echo within the environment 102 that is associated with the audio of a speaker associated with the voice-controlled device 106. As illustrated, the voice-controlled device 106 may include a processor 112 and memory 114. As used herein, the processor 112 may include multiple processors 112 and/or a processor 112 having multiple cores.

In some instances, the voice-controlled device 106 may operate in conjunction with or may otherwise utilize computing resources 116 that are remote from the environment 102. For instance, the voice-controlled device 106 may couple to the remote computing resources 116 over a network 118. As illustrated, the remote computing resources 116 may be implemented as one or more servers 120(1), 120(2), . . . , 120(P), remote devices, or a collection of servers or devices, and may, in some instances, form a portion of a network-accessible computing platform implemented as a computing infrastructure of processors 112, storage, software, data access, and so forth that is maintained and accessible via a network 118 such as the Internet. The remote computing resources 116 may not require end-user knowledge of the physical location and configuration of the system that delivers the services. Common expressions associated for these remote computing resources 116 may include "on-demand computing", "software as a service (SaaS)", "platform computing", "network-accessible platform", "cloud services", "data centers", and so forth.

The servers 120(1)-(P) may include a processor 122 and memory 124, which may store or otherwise have access to some or all of the components described with reference to the memory 114 of the voice-controlled device 106. For instance, the memory 124 may have access to and utilize the speech-recognition engine 130 for receiving audio signals from the device 106, recognizing, and differentiating between, speech and other noise and, potentially, causing an action to be performed in response thereto. In some examples, the voice-controlled device 106 may upload audio data to the remote computing resources 116 for processing, given that the remote computing resources 116 may have a computational capacity that exceeds the computational capacity of the voice-controlled device 106. Therefore, the voice-controlled device 106 may utilize the speech-recognition engine 130 at the remote computing resources 116 for performing relatively complex analysis on audio captured from the environment 102. For the purpose of this discussion, an audio signal may be a representation of sound (analog, digital, or otherwise) that is detected or captured by one or more microphones 108.

Regardless of whether the speech recognition occurs locally or remotely from the environment 102, the voice-controlled device 106 may receive vocal input from the user 104 and the device 106 and/or the resources 116 may perform speech recognition to interpret a user's 104 operational request or command. The requests may be for essentially any type of operation, such as authentication, database inquires, requesting and consuming entertainment (e.g., gaming, finding and playing music, movies or other content, etc.), personal management (e.g., calendaring, note taking, etc.), online shopping, financial transactions, communication (e.g., placing and/or receiving telephone calls), and so forth. The voice-controlled device 106 may also interpret noise and/or acoustic echo detected by the microphone(s) 108 and determine that the noise/acoustic echo is not from the target source (e.g., the user 104). To interpret the user's 104 speech, the voice-controlled device 106 and/or the remote computing resource(s) 116 may make a distinction between the target voice (of the user 104) and acoustic echo and other noise within the environment 102 (e.g., other voices, audio from a television, background sounds from a kitchen, etc.). As a result, the target voice may be enhanced, while ambient noise that is detected within the environment 102 and the acoustic echo that is generated within the environment 102 may be reduced.

The voice-controlled device 106 may communicatively couple to the network 118 via wired technologies (e.g., wires, USB, fiber optic cable, etc.), wireless technologies (e.g., RF, cellular, satellite, Bluetooth, etc.), or other connection technologies. The network 118 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 114 of the voice-controlled device 106 may also store or otherwise has access to a detection module 126, a signal processing module 128, a speech recognition module 130, a data transfer module 132, a bandwidth determination module 134, and an data management module 136, which may include a data recordation module 138 and a data provider module 140. Although not shown, in other embodiments, some or all of the foregoing modules may be maintained by, or associated with, one or more of the remote computing resources 116.

The voice-controlled device 106 may include a media player that may function to output any type of content on any type of output component of the device 106. For instance, the media player may output audio of a video or standalone audio via the speaker 110. For instance, the user 104 may interact (e.g., audibly) with the device 106 to instruct the media player to cause output of a certain song or other audio file. The audio being output by the speaker 110 or a speaker of another device may be processed for the purpose of increasing efficacy of the speech recognition engine 130. For instance, in response to receiving an indication that the user 104 is going to provide a voice command to the device 106, the output of the audio may be modified to increase the accuracy of speech recognition performed on an audio signal generated from sound captured by the microphone 108.

As described above, the voice-controlled device 106 may attenuate the audio, pause the audio, switch output of the audio from stereo to mono, attenuate a particular frequency range of the audio, turn off one or more speakers 110 outputting the audio or may alter the output of the audio in any other way. Furthermore, the voice-controlled device 106 may determine how or how much to alter the output the audio based on one or more of an array of characteristics, such as a distance between the user 104 and the device 106, a direction of the user 104 relative to the device 106 (e.g., which way the user 104 is facing relative to the device 106), the type or class of audio being output, the identity of the user 104 himself, a volume of the user's 104 speech indicating that he is going to provide a subsequent voice command to the device 106, or the like.

The voice-controlled device 106 may also function to identify a location of the user 104 within the environment 102, which may include the actual location of the user 104 in a two-dimensional (2D) or a three-dimensional (3D) space, a distance between the user 104 and the device 106, a direction of the user 104 relative to the device 106, or the like. The voice-controlled device 106 may determine this location information in any suitable manner. In some examples, the device 106 includes multiple microphones 108 that each generates an audio signal based on sound that includes speech of the user 104 (e.g., the user 104 stating "wake up" to capture the device's 106 attention). In these instances, the voice-controlled device 106 may utilize time-difference-of-arrival (TDOA) techniques to determine a distance of the user 104 from the device 106. That is, the voice-controlled device 106 may cross-correlate the times at which the different microphones 108 received the audio to determine a location of the user 104 relative to the device 106 and, hence, a distance between the user 104 and the device 106.

In another example, the device 106 may include a camera that captures images of the environment 102. The voice-controlled device 106 may then analyze these images to identify a location of the user 104 and, potentially, a distance of the user 104 to the device 106 or a direction of the user 104 relative to the device 106. Based on this location information, the voice-controlled device 106 may determine how to modify output of the audio (e.g., whether to turn off a speaker 110, whether to instruct the media player to attenuate the audio, etc.).

Next, the voice-controlled device 106 may utilize one or more techniques to identify the user 104, which may then be used to determine how to alter the output of the audio. In some instances, the voice-controlled device 106 may work with the speech recognition engine 130 to determine a voice print of the user 104 and, thereafter, may identify the user 104 based on the voice print. In examples where the device 106 includes a camera, the voice-controlled device 106 may utilize facial recognition techniques on images captured by the camera to identify the user 104. In still other examples, the device 106 may engage in a back-and-forth dialogue to identify and authenticate the user 104. Of course, while a few examples have been listed, the voice-controlled device 106 may identify the user 104 in any other suitable manner.

After identifying the user 104, the device 106 may reference a corresponding user profile of the identified user 104 to determine how to alter the output of the audio. For instance, one user 104 may have configured the device 106 to pause the audio, while another user 104 may have configured the device 106 to attenuate the audio. In other instances, the device 106 may itself determine how best to alter the audio based on one or more characteristics associated with the user 104 (e.g., a general volume level or frequency of the user's 104 speech, etc.). In one example, the device 106 may identify a particular frequency range associated with the identified user 104 and may attenuate that frequency range in the audio being output.

In certain embodiments, the detection module 126 may be associated with the one or more microphones 108 of the voice-controlled device 106 and may detect audio (e.g., sound) or other signals (e.g., electrical signals) within the environment 102. For instance the detection module 126 may detect a voice from a target user 104, ambient or background noise within the environment 102, and/or acoustic echo associated with the detected voice that exists within the environment 102.

The signal processing module 128 of the voice-controlled device 106 may process one or more audio signals that are generated by the microphone(s) 108 and that correspond to the captured audio. Such processing may include performing beamforming, echo cancellation, and/or noise reduction with respect to the audio signal(s), as will be described below in additional detail. In various embodiments, background noise, acoustic echo, reverberation, etc., may be referred to herein as "noise." In particular, the signal processing module 128 may select an audio signal that is associated with a voice of a user 104, reduce acoustic echo associated with that audio signal, and/or reduce noise associated with the audio signal. As a result, the signal processing module 128 may generate or output a processed (e.g., cleaned) audio signal. As stated above, an audio signal may be representative of sound detected within the environment 102. Moreover, an unprocessed version of the audio signal may correspond to an audio signal that represents the raw audio that was captured by the microphone(s) 108. On the other hand, after noise reduction, echo cancellation, etc., is performed on the audio signal, the audio signal may be referred to as a processed version of the audio signal.

The speech-recognition module 130 may perform speech recognition on audio signals generated by the microphone(s) 108, with these signals being generated from sound within the environment 102, such as utterances spoken by the user 104. In particular, the speech-recognition module 130 may perform speech recognition with respect to the audio signal that was previously processed by the signal processing module 128. The voice-controlled device 106 may perform certain actions in response to recognizing different speech from the user 104. The user 104 may speak predefined commands (e.g., "Awake", "Sleep", etc.), or may use a more casual conversation style when interacting with the device 106 (e.g., "I'd like to go to a movie. Please tell me what's playing at the local cinema.").

The data transfer module 132 may transfer, provide, stream, transmit, etc., audio signals captured by the microphone(s) 108 of the voice-controlled device 106 to one of the remote computing resources 116. That is, instead of the voice-controlled device 106 processing the audio signal, the unprocessed version of the audio signal may be provided to the remote computing resources 116, which may then process the audio signal. The remote computing resource 116 may also perform speech recognition with respect to the processed audio signal.

The bandwidth determination module 134 may determine the bandwidth of the network 118 that is associated with, or communicatively coupled to, the voice-controlled device 106. The determined bandwidth of the network 118 may be considered in order to determine whether the voice-controlled device 106, the remote computing resource(s) 116, or a combination of the two, is to process the audio signal(s). For instance, if the bandwidth is determined to be greater than a particular bandwidth threshold, the audio signals may be provided to the remote computing resource(s) 116 for processing. Otherwise, the processing of the audio signal(s) may be performed by the voice-controlled device 106.

The data management module 136 may cause the voice-controlled device 106 to process the audio signal(s) and then either the voice-controlled device 106 or the remote computer resource(s) 116 may perform speech recognition with respect to the audio signal. The data recordation module 138 of the data management module 136 may record, store, and/or log the audio captured by the microphone(s) 108. The audio that is recorded by the data recordation module 138 may correspond to the audio signal(s) that were processed by the voice-controlled device 106.

In some embodiments, the data provider module 140 may stream the captured audio to the remote computing resource(s) 116. More particularly, the data provider module 140 may asynchronously stream or transfer the audio signals to the remote computing resource(s) 116 at a rate that may be dependent upon the network 118 and/or the available bandwidth of the network 118. As a result, the remote computing resource(s) 116 may utilize the unprocessed audio signals in order to improve the performance or the accuracy of the processing and speech recognition associated with audio signal.

Figure 2:
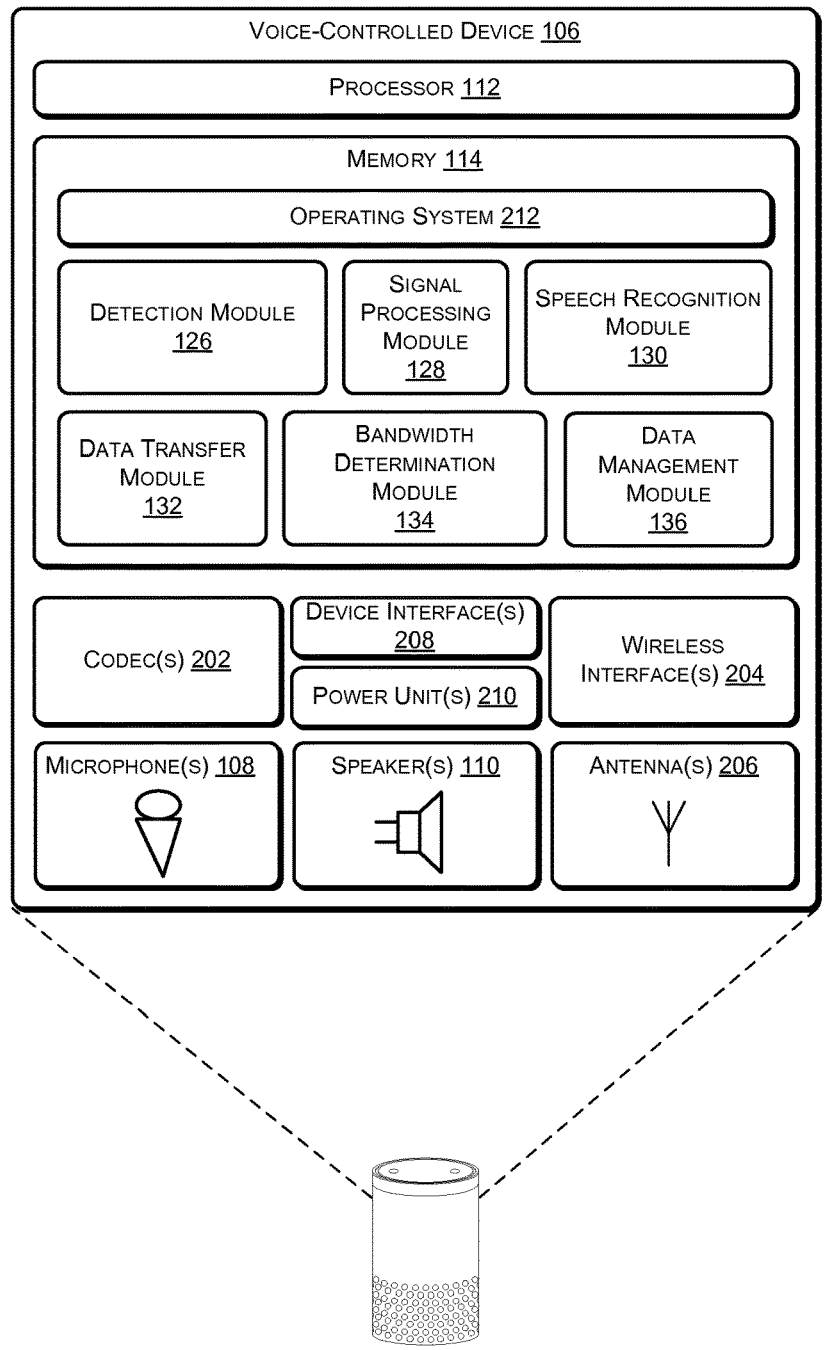
FIG. 2 shows a block diagram of selected functional components implemented in the voice-controlled device of FIG. 1.

FIG. 2 shows selected functional components and/or modules of one implementation of the voice-controlled device 106 in more detail. Generally, the voice-controlled device 106 may be implemented as a standalone device 106 that is relatively simple in terms of functional capabilities with limited input/output components, memory 114 and processing capabilities. For instance, the voice-controlled device 106 may not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 may include the processor 112 and memory 114. The memory 114 may include computer-readable storage media ("CRSM"), which may be any available physical media accessible by the processor 112 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 may include a microphone unit that comprises one or more microphones 108 to receive audio input, such as user voice input and/or other noise. The device 106 also includes a speaker unit that includes one or more speakers 110 to output audio sounds. One or more codecs 202 are coupled to the microphone 108 and the speaker 110 to encode and/or decode the audio signals. The codec 202 may convert audio data between analog and digital formats. A user 104 may interact with the device 106 by speaking to it, and the microphone 108 may capture sound and generate an audio signal that includes the user speech. The codec 202 may encode the user speech and transfer that audio data to other components. The device 106 can communicate back to the user 104 by emitting audible statements through the speaker 110. In this manner, the user 104 interacts with the voice-controlled device 106 simply through speech, without use of a keyboard or display common to other types of devices.

In the illustrated example, the voice-controlled device 106 may include one or more wireless interfaces 204 coupled to one or more antennas 206 to facilitate a wireless connection to a network 118. The wireless interface 204 may implement one or more of various wireless technologies, such as Wi-Fi, Bluetooth, radio frequency (RF), and so on.

One or more device interfaces 208 (e.g., USB, broadband connection, etc.) may further be provided as part of the device 106 to facilitate a wired connection to a network 118, or a plug-in network device 106 that communicates with other wireless networks 118. One or more power units 210 may further be provided to distribute power to the various components of the device 106.

The voice-controlled device 106 may be designed to support audio interactions with the user 104, in the form of receiving voice commands (e.g., words, phrase, sentences, etc.) from the user 104 and outputting audible feedback to the user 104. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device 106) to indicate a state such as, for example, when power is on or to indicate when a command is received. But, otherwise, the device 106 may not use or need to use any input devices or displays in some instances.

Several modules such as instructions, datastores, and so forth may be stored within the memory 114 and configured to execute on the processor 112. An operating system 212 may be configured to manage hardware and services (e.g., wireless unit, Codec, etc.) within, and coupled to, the device 106 for the benefit of other modules.

In addition, the memory 114 may include the detection module 126, the signal processing module 128, the speech recognition module 130, the data transfer module 132, the bandwidth determination module 134, and the data management module 136. Also as discussed above, some or all of these engines, data stores, and components may reside additionally or alternatively at the remote computing resources 116.

FIGS. 3-6 each depict a flow diagram of example processes for processing one or more audio signals. The voice-controlled device 106, the remote computing resource(s) 116, other computing devices or a combination thereof may perform some or all of the operations described below.

Each of the processes are illustrated as a logical flow graph, the operations of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks 118. Finally, the order in which the operations are described is not intended to be construed as a limitation, and any number of the described operations can be combined in any order and/or in parallel to implement the process.

Figure 3:
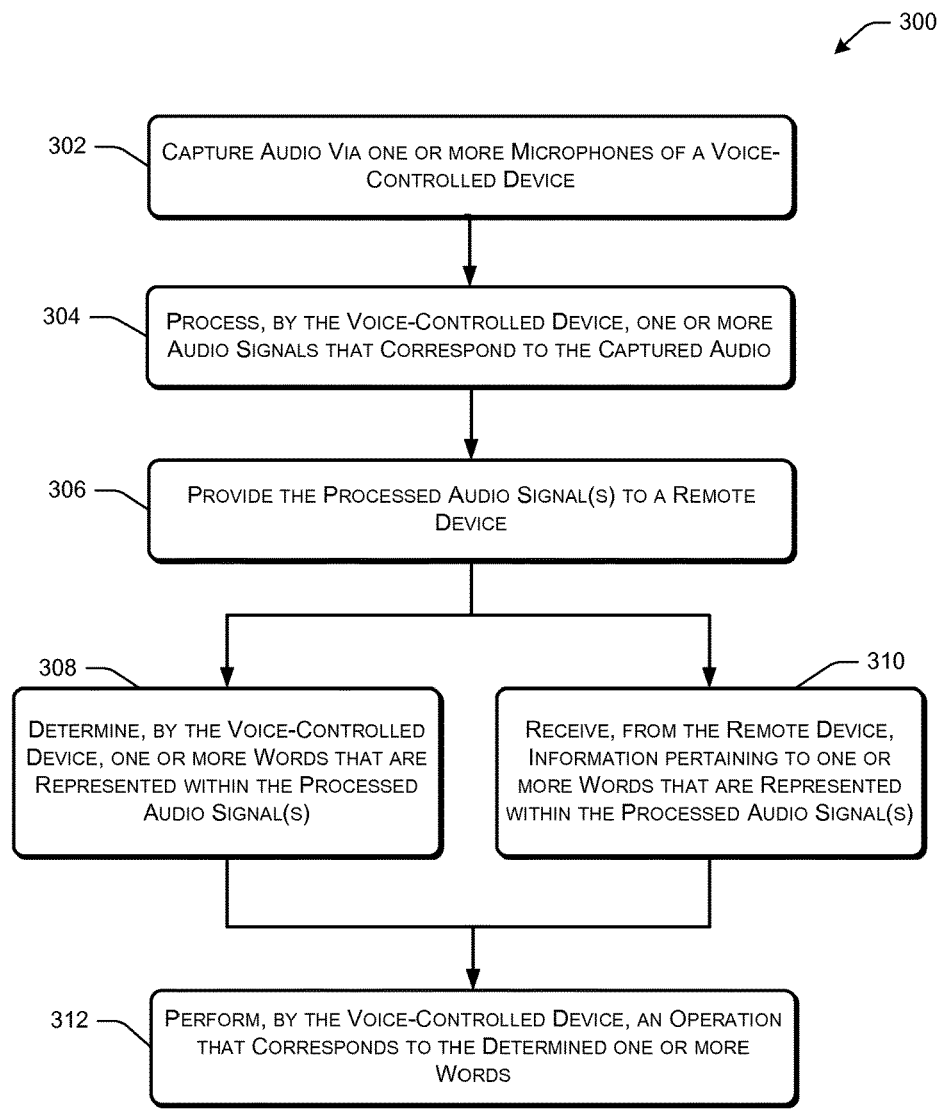
FIG. 3 shows a flow diagram of an example process for processing, by a voice-controlled device, an audio signal associated with audio captured within a physical space.

FIG. 3 shows an illustrative flow diagram 300 for processing, by a voice-controlled device, one or more audio signals that correspond to audio captured within a physical space. More particularly, the voice-controlled device 106 may select an audio signal that is most representative of a voice detected within a physical space, and then reduce at least a portion of acoustic echo and/or noise that is associated with the audio signal, which allows the voice-controlled device 106 to better interpret the audio signal. The voice-controlled device 106 and/or a remote device (e.g., the remote computing resource(s) 116), or a combination of the two, may then perform speech recognition with respect to the audio signal in order to determine one or more words that are represented within the audio signal.

Block 302 illustrates capturing audio via one or more microphones of a voice-controlled device. More particularly, the microphone(s) 108 of the voice-controlled device 106 may detect and/or capture audio (e.g., sound) within the environment 102 (hereinafter referred to as "captured audio", "audio data" or "unprocessed audio"), and may generate an audio signal that corresponds to the detected audio, where the audio signal may correspond to the voice of a particular user 104. As described above with respect to FIG. 1, the voice-controlled device 106 may include multiple microphones 108 that each capture audio and that may each generate a different audio signal.

Block 304 illustrates processing, by the voice-controlled device, one or more audio signals that correspond to the captured audio. In particular, in response to capturing the audio and generating the audio signal, the signal processing module 128 may perform beamforming, echo cancellation (e.g., acoustic echo cancellation), and/or noise reduction techniques on the audio signal(s). That is, the signal processing module 128 may select a particular beam from one of the microphones 108 to process as a selected audio signal, and then reduce/cancel the amount of noise and/or the amount of acoustic echo associated with that audio signal. This may be performed in the time domain, which may be referred to as the analysis of functions, signals, or data with respect to time. In other embodiments, the signal processing module 128 may operate in the frequency domain, which may be referred to as the analysis of functions, signals, or data with respect to frequency.

In various embodiments, the audio is captured by, and the audio signal is generated by, one or more microphones 108 that may be identical or similar to one another. In some embodiments, the microphones 108 may include a main or primary microphone 108 and additional reference or secondary microphones 108. For instance, the voice-controlled device 106 may have multiple microphones 108 and the audio signal may be analyzed for each microphone 108 that detects/captures the audio. Therefore, the signal processing module 128 may generate multiple different beams or channels, where each of the beams or channels corresponds to a different one of the microphones 108. Subsequently, acoustic echo cancellation and/or noise reduction may be performed with respect to some or all of the beams. Therefore, the output of the signal processing module 128 may represent a single processed audio signal that does not include any, or at least includes a reduced amount of, acoustic echo and noise.

In some embodiments, the acoustic echo within the environment 102 may be relatively strong due to the close proximity between the microphone(s) 108 and the speaker(s) 110 of the voice-controlled device 106. As a result, the amount of noise and/or acoustic echo in the audio signal may not be sufficient to allow for accurate voice activity detection (VAD) and/or automated speech recognition (ASR) of the audio signal (provided that the audio signal includes a user voice). In other words, after performing beamforming with respect to the audio signal, the amount of noise and/or acoustic echo within the environment 102 and associated with the audio signal may make it difficult to detect the target voice and to determine the words or phrases that were uttered by the user 104. Therefore, acoustic echo cancellation and noise reduction techniques may be applied to the beams or the resulting selected audio signal to reduce the amount of acoustic echo and noise, respectively, associated with the audio signal.

For the purposes of this discussion, beamforming may correspond to a signal processing technique for directional signal transmission or reception. In some embodiments, beamforming may be associated with a sensor array or a phased array, which may be an array of sensors (e.g., antennas) in which the relative phases of signals associated with the sensors are varied such that the pattern of the array is reinforced in a desired direction and suppressed in undesired directions. More particularly, the elements in a phased array may be combined in such a way that signals at particular angles experience constructive interference, while other signals experience destructive interference. Moreover, with respect to a signal (e.g., an audio signal), beamforming may be used at both the transmitting and receiving ends in order to achieve spatial selectivity. In further embodiments, adaptive beamforming may be utilized to detect and estimate a signal-of-interest (e.g., a particular voice) at the output of a sensor array, such as by using optimal (e.g., least-squares) spatial filtering and interference rejection. In addition, adaptive beamforming may adjust its performance with respect to differences detected within an environment 102.

With respect to the voice-controlled device 106, beamforming may be performed for each of the multiple microphones 108 that are associated with, and that generate, an audio signal. More particularly, each of the multiple microphones 108 may capture audio that corresponds to an audio signal. The signal processing module 128 may select at least one of these audio signals for further processing (e.g., echo cancellation, noise reduction, etc.). In various embodiments, the audio signal that is selected may be the audio signal with the loudest sound source (e.g., a voice of a user 104). The selected audio signal may also be based on a determined identity of a source (e.g., a speaker) of the voice that is detected by the microphone(s) 108.

Upon selecting an audio signal to process, the signal processing module 128 may reduce the amount of echo (e.g., acoustic echo) associated with the audio signal. The acoustic echo may correspond to when an audio signal is output from a speaker 110 and then the corresponding audio is captured by the microphone 108. The acoustic echo may pose difficulties in detecting and interpreting the audio signal for the purposes of determining an intended operation that corresponds to a voice command of the user 104. As a result, the signal processing module 128 may reduce, cancel, or eliminate acoustic echo that is associated with the audio signal.

For the purposes of this discussion, acoustic echo may correspond to a reflection of sound that arrives at the listener (e.g., the user 104 or the voice-controlled device 106) sometime after the direct sound was output and captured. Moreover, acoustic echo may arise when sound from a speaker 110 (e.g., a loudspeaker) is captured by a microphone 108 that is in close proximity to the speaker 110 (e.g., within the same room, part of the same device, etc.). In other embodiments, acoustic echo may occur with respect to an audio signal, where the audio signal is initially transmitted and then reappears in the transmitted or received signal with some delay. In addition to the acoustic echo making it difficult to detect and interpret the voice of a particular user 104, a user 104 within the environment 102 may hear their own voice being repeated, which results in a poor user experience. In some embodiments, the amount of echo associated with the audio signal may be reduced by utilizing adaptive directionality and various acoustic echo cancellation techniques.

In various embodiments, the signal processing module 128 may cancel the acoustic echo by first capturing a far-end audio signal (e.g., the voice of a user 104). As a result, the far-end audio signal may be output by the speaker(s) 110 of the voice-controlled device 106. The microphone(s) 108 of the voice-controlled device 106 may also detect and capture the resulting direct path sound, and consequent reverberant sound as a near-end signal. In other words, acoustic echo may occur when a microphone 108 initially captures audio within a physical space and then picks up audio signals from, and output by, a speaker 110. In various embodiments, provided that the audio is a voice of a user 104, the user 104 may hear the echo of their own voice as that user 104 speaks. Moreover, the amount of acoustic echo may depend at least in part on the sensitivity of the microphone(s) 108 that are capturing the audio, the volume of the speaker 110, and/or the positions of the microphone(s) 108 and the speaker 110.

The signal processing module 128 may then cause the far-end audio signal to be filtered and delayed to resemble echo of the near-end audio signal. Then, the filtered far-end audio signal may be subtracted from the near-end audio signal. The resulting signal may represent audio present within the environment 102 that generally excludes any, or at least reduces the amount of, direct or reverberated sound generated by the speaker(s) 110 of the voice-controlled device 106. That is, echo cancellation may involve first recognizing the originally transmitted signal that re-appears, with some delay, in the transmitted or received signal. Once the acoustic echo is recognized, it may be removed by subtracting it from the audio signal. In some embodiments, acoustic echo cancellation may be implemented using a digital signal processor (DSP) or one or more algorithms.

In the event that acoustic echo and/or noise associated with the audio signal exists after acoustic echo cancellation is performed, the signal processing module 128 may reduce or cancel noise associated with the audio signal. The noise may correspond to ambient or background noise, such as voices of other users 104, audio signals output by other devices within the environment 102, etc. The signal processing module 128 may utilize one or more algorithms to reduce or cancel such noise. Various algorithms may function in the time-domain or in the frequency-domain using linear or non-linear filters. Moreover, the signal processing module 128 may specify thresholds, dynamic or otherwise, for filtering the noise that is derived from the audio signal. In some embodiments, audio that falls below the threshold (e.g., noise) may be filtered out, while any audio at or above the threshold (e.g., voice or desired noise) may pass through the filter. As a result, the signal processing module 128 may retain desired audio within the audio signal and reduce, cancel, or suppress unwanted noise associated with the audio signal.

In some embodiments, the signal processing module 128 may not be able to cancel, suppress, or eliminate all of the acoustic echo and noise associated with the audio signal. As a result, at least some residual acoustic echo and noise that is associated with the original audio signal may still exist. Accordingly, the signal processing module 128 may suppress or reduce at least a portion of such residual acoustic echo/noise. That is, the signal processing module 128 may suppress or reduce some or all of the remaining acoustic echo and noise that is associated with the audio signal.

Instead of using a single technique to reduce the acoustic echo and/or noise associated with a detected audio signal, the voice-controlled device 106 may utilize multiple processes to significantly reduce/suppress and possibly eliminate such acoustic echo and/or noise. In other words, the voice-controlled device 106 may achieve a much better reduction/suppression of acoustic echo/noise. The resulting audio signal may represent an enhanced audio signal that may be processed using VAD and/or ASR. That is, the voice-controlled device 106 and/or the remote computing resource(s) 116 may detect a voice of the user 104 and then determine the specific words or phrases that were uttered by the user 104. In response to identifying those words or phrases, the voice-controlled device 106 may perform a corresponding operation.

Block 306 illustrates providing the processed audio signal(s) to a remote device. In various embodiments, the processed audio signal that has a reduced amount of acoustic echo and/or noise may be streamed or transmitted to the remote computing resource(s) 116. In some embodiments, to reduce bandwidth or in a bandwidth limited environment, the processed audio signal may be compressed by the voice-controlled device 106 prior to being streamed to the remote computing resource(s) 116. For instance, the processed audio signal may be compressed utilizing a compression algorithm, a standard voice codec, or an ASR-specific codec. In various embodiments, any type of compression techniques may be utilized, such as lossy or lossless compression. Upon receiving the processed audio signal, the remote computing resource(s) 116 may then apply VAD and/or speech recognition (e.g., ASR) techniques with respect to the processed audio signal, as described below. Alternatively, or in addition, the voice-controlled device 106 may perform at least some VAD and/or ASR with respect to the processed audio signal.

Block 308 illustrates determining, by the voice-controlled device, one or more words that are represented within the processed audio signal(s). That is, although the processed audio signal is transmitted to the remote computing resource(s) 116, the voice-controlled device 106 may nonetheless perform at least some VAD and/or ASR with respect to the processed audio signal. In particular, the voice-controlled device 106 may determine words represented within the audio signal for the purpose of being able to quickly respond to a user request. For instance, if it is determined that the audio signal includes a command or a request to perform a particular operation immediately, the voice-controlled device 106 may recognize the command/request, and then perform a corresponding operation in response thereto. As a result, the voice-controlled device 106 may respond to a user 104 with little to no latency, which may provide for a positive user experience. Upon performing at least some of the VAD and/or ASR with respect to the processed audio signal, the voice-controlled device 106 may optionally allow the remote computing resource(s) 116 to further perform additional or more advanced speech recognition.

Block 310 illustrates receiving, from the remote device, one or more words that are represented within the processed audio signal(s). Regardless of whether the voice-controlled device 106 performs any VAD or ASR with respect to the processed audio signal, the remote computing resource(s) 116 may also perform VAD and ASR on the processed audio signal. Since the voice-controlled device 106 may have a limited amount of resources (e.g., memory, CPU, etc.) and may be bandwidth limited, the remote computing resource(s) 116 may have additional and possibly more powerful resources to interpret the processed audio signal. As a result, in some embodiments, the remote computing resource(s) 116 may be able to perform VAD and/or ASR more accurately or more efficiently. In response to the remote computing resource(s) 116 determining one or more words that are represented within the processed audio signal, the remote computing resource(s) 116 may transmit information relating to such words to the voice-controlled device 116.

For the purposes of this discussion, speech recognition (e.g., ASR) may correspond to techniques for translating spoken words into text. As a result, by performing speech recognition techniques with respect to the processed audio signal, the voice-controlled device 106 and/or the remote computing resource(s) 116 may determine one or more words that are represented within the processed audio signal. Various algorithms or models (e.g., Hidden Markov models, neural networks, etc.) may be utilized to parse the processed audio signal in order to identify words that were uttered by a user 104.

Block 312 illustrates performing, by the voice-controlled device, an operation that corresponds to the determined one or more words. More particularly, upon determining one or more words that are represented within the processed audio signal, and upon determining a operation that corresponds to those words, the voice-controlled device 106 and/or the remote computing resource(s) 116 may cause that operation to be performed. For instance, if it is determined that a user 104 orally requested that a particular image be projected, the voice-controlled device 106 may project that image within the environment 102.

Processing the audio signal at the voice-controlled device 106 may have numerous benefits. For example, a network 118 that is communicatively coupled to the voice-controlled device 106 may not have sufficient upload/download rates or adequate bandwidth to stream the captured audio data to the remote computing resource(s) 116. This is especially so if the unprocessed audio data is not compressed prior to being transmitted to the remote computing resource(s) 116. As a result, provided that the voice-controlled device 106 has sufficient resources, it may be advantageous to process the captured audio data at the voice-controlled device 106. Moreover, compressing the unprocessed audio data may use a significant amount of computational resources of the voice-controlled device 106. Therefore, if the voice-controlled device 106 is limited with respect to memory, CPU, or other resources, it may be more efficient for the voice-controlled device 106 to process the audio data.

Figure 4:
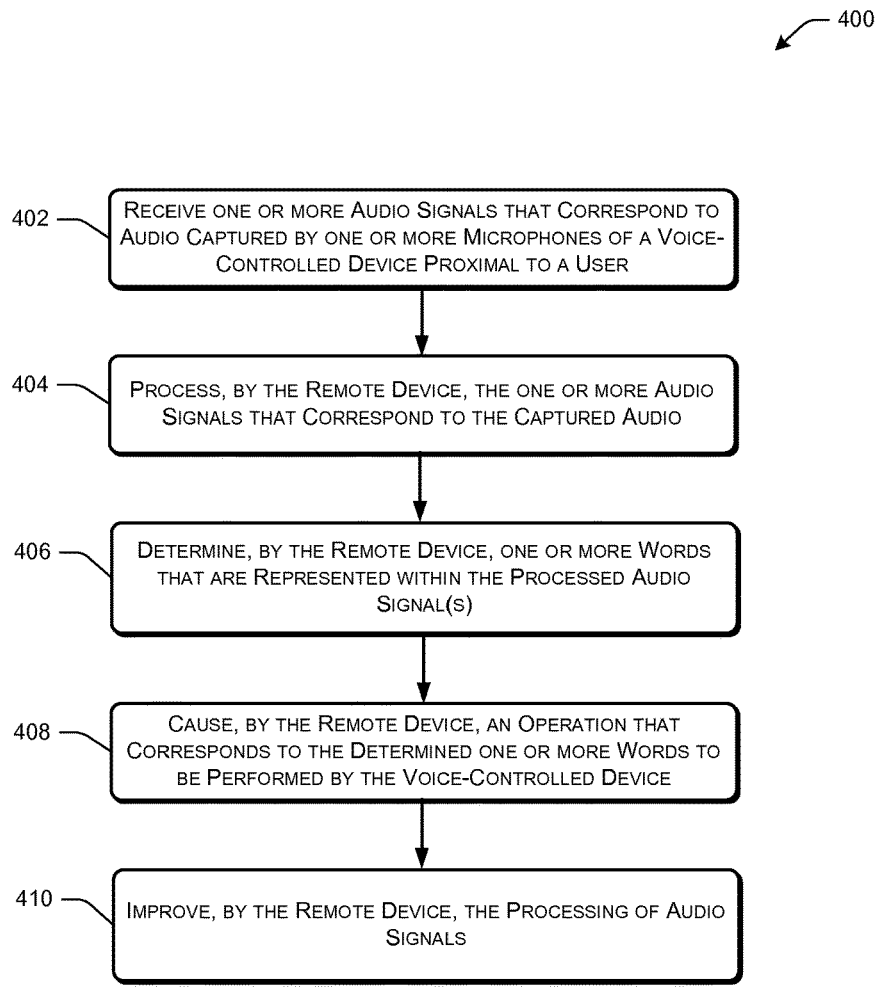
FIG. 4 shows a flow diagram of an example process for providing audio signals to a remote device, which then may process the audio signals.

FIG. 4 shows an illustrative flow diagram 400 for processing, by a remote device, one or more audio signals that correspond to audio captured within a physical space. The voice-controlled device 106, the remote computing resource(s) 116, or a combination of the two, may perform some or all of the following operations.

Block 402 illustrates receiving one or more audio signals that correspond to audio captured by one or more microphones of a voice-controlled device proximal to a user. As described above with respect to FIG. 3, one or more microphones 108 of the voice-controlled device 106 may capture sound within a physical space. Moreover, instead of the voice-controlled device 106 processing the one or more audio signals that correspond to (e.g., represent) the captured audio, the unprocessed audio signals may be provided directly to the remote computing resource(s) 116. These audio signals may correspond to the audio captured by each of the multiple microphones 108 of the voice-controlled device 106 and the audio signals may be streamed in real-time, or near real-time. Moreover, at least some of the audio signals may be streamed at a later time in order to support system improvement or the updating (e.g., addition, modification, deletion, etc.) of algorithms associated with the processing of the audio signals, while also reducing bandwidth requirements for the voice-controlled device 106 and/or the network 118.

Block 404 illustrates processing, by the remote device, the one or more audio signals that correspond to the captured audio. In various embodiments, in response to receiving the unprocessed audio signals, the remote computing resource(s) 116 may process one the unprocessed audio signals. That is, the remote computing resource(s) 116 may perform beamforming, echo cancellation, noise reduction, etc., with respect to the audio signal(s), meaning that the remote computing resource(s) 116 may select one of the beams as the audio signal and then reduce acoustic echo and/or noise associated with the audio signal.

Transferring the unprocessed audio signals from the voice-controlled device 106 to the remote computing resource(s) 116 may allow the audio signal(s) to be processed in a more efficient and/or accurate manner. For instance, while the voice-controlled device 106 may be limited in terms of resources, bandwidth, or capacity, the remote computing resource(s) 116 may have additional flexibility, such as having additional CPU, additional memory, additional capacity, reduced costs, etc.

Block 406 illustrates determining, by the remote device, one or more words that are represented within the processed audio signal(s). As stated above, using various VAD and speech recognition technologies and techniques, the remote computing resource(s) 116 may determine one or more words that correspond to an utterance spoken by a user 104.

Block 408 illustrates causing, by the remote device, an operation that corresponds to the determined one or more words to be performed by the voice-controlled device 106. That is, upon determining one or more words that are represented within the processed audio signal, the remote computing resource(s) 116 may determine an operation that corresponds to those words. Then, the remote computing resource(s) 116 may instruct the voice-controlled device 106 to perform the determined operation.

Block 410 illustrates improving, by the remote device, the processing of audio signals. More particularly, by utilizing the unprocessed raw audio data that was provided by the voice-controlled device 106, which may be represented by the unprocessed audio signals, the remote computing resource(s) 116 may improve how audio signals are processed, such as by increasing the accuracy or efficiency of such processing. For instance, with respect to algorithms that are used to process the audio signals, the remote computing resource(s) 116 may determine how the audio signals were processed and the accuracy of the processing, and then use this information to select, deselect, or modify those algorithms (e.g., modify variables, determine coefficients, etc.) and/or to develop or implement algorithms. The same audio signals may then be processed utilizing the added or modified algorithms to determine if the results of the processing are more accurate, efficient, etc. Therefore, by processing audio signals in the cloud (e.g., by the remote computing resource(s) 116), the algorithms, functions and operations actually used to process the audio signals may be changed or modified in real-time, near real-time, or at a later time.

In various embodiments, the signal processing module 128 may utilize one or more algorithms to process audio signals. Based at least in part on the audio signals sent by the voice-controlled device 106, the remote computing resource(s) 116 may select one of the algorithms that will subsequently be utilized by the signal processing module 128. For instance, the selected algorithm may be determined to be more efficient, less computationally intensive, more accurate, etc., than other algorithms. On the other hand, one of the algorithms previously used by the signal processing module 116 may be deselected, meaning that the deselected algorithm may no longer be utilized by the signal processing module 128, either permanently or temporarily, to process the audio signals. Such algorithms may be deselected if they are determined to be less efficient, more computationally intensive, less accurate, or if the maintenance associated with that algorithm is relatively high or cost-intensive.

Moreover, at least one of the algorithms may be modified, such as by modifying a variable, value, coefficient, parameter, constant, etc., of the algorithm. For example, the remote computing resource(s) 116 may determine that various variables, values, coefficients, parameters, constants, etc., may cause an algorithm to function more efficiently, more accurately, etc. In other embodiments, the remote computing resource(s) 116 may modify an application of a particular algorithm, meaning that the manner in which the algorithm is applied to various audio signals is changed. As a result, the remote computing resource(s) 116 may cause the signal processing module 128 to utilize a modified or updated version of the algorithm for subsequent signal processing.

The remote computing resource(s) 116 may also identify or create new algorithms that were not previously utilized by the signal processing module 128. Such algorithms may cause the processing of audio signals to be more accurate, more efficient, less computationally intensive, less cost-intensive, and so on, in comparison to previously used algorithms. Upon identifying the new algorithms, the remote computing resource(s) 116 may cause the voice-controlled device 106 to implement the new algorithms.

The remote computing resource(s) 116 may also attempt different strategies, possibly in parallel, for processing the audio signals. By doing so, the remote computing resource(s) 116 may determine which strategies, processes, or algorithms are most effective and/or have the highest level of performance. In some embodiments, multiple devices in the cloud may process the same audio signal using different processes or algorithms. For example, multiple different remote devices may process the audio signals in order to determine appropriate coefficients for the algorithms. The multiple different remote devices may also utilize different algorithms, or different versions of the same algorithm, to determine which algorithms perform better than others. As result, the remote computing resource(s) 116 may determine which processes, algorithms, devices reduce the greatest amount of echo or noise, perform the most accurate VAD, or perform the most accurate and timely speech recognition.

In certain embodiments, the remote computing resource(s) 116 may also have sufficient resources to run more complicated and/or computationally intensive algorithms that are utilized to process the audio signal(s). These algorithms may allow for the audio signal(s) to be processed more efficiently and in a more accurate manner, while a resource-constrained device may not have adequate memory, CPU, bandwidth, etc., to implement such algorithms. Moreover, to implement these algorithms on a resource/memory-constrained device, the algorithms may have to be modified in order to run most effectively on that device, which may take a significant amount of time, cost, and effort. In other embodiments, the remote computing resource(s) 116 may serve as an alternative option for processing the audio signal(s) if it is determined that a particular voice-controlled device 106 is not functioning properly. Thus, the remote computing resource(s) 116 may serve as a back-up option for processing the audio signal(s). Therefore, the raw unprocessed audio data may be used by the remote computing resource(s) 116 for experimentation, research, and refinement of the voice-controlled device 106, the remote computing resource(s) 116, and the algorithms associated therewith.

Figure 5:
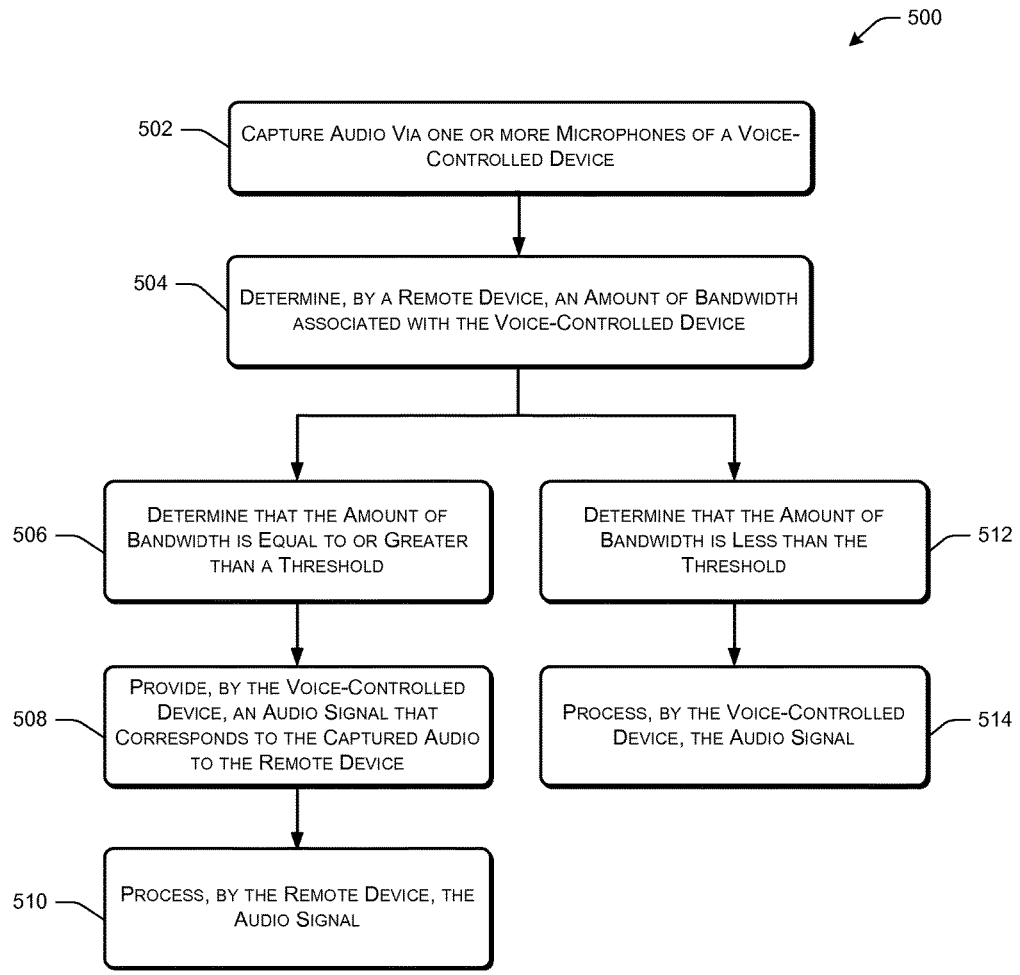
FIG. 5 shows a flow diagram of an example process for processing audio signals based on an amount of available bandwidth associated with a network and/or a voice-controlled device.

FIG. 5 shows an illustrative flow diagram 500 for processing one or more audio signals based at least in part on a determined amount of bandwidth associated with a voice-controlled device. The voice-controlled device 106, the remote computing resource(s) 116, or a combination of the two, may perform some or all of the following operations.

Block 502 illustrates capturing audio via one or more microphones of a voice-controlled device. In various embodiments, multiple microphones 108 of the voice-controlled device 106 may capture audio within a physical space, where each microphone 108 may be associated with, or may generate, a different audio signal.

Block 504 illustrates determining, by a remote device, an amount of bandwidth associated with the voice-controlled device. More particularly, for a particular voice-controlled device 106, the remote computing resource(s) 116 may determine the bandwidth (or available bandwidth) of a network 118 that is accessible or communicatively coupled to the voice-controlled device 106. However, the bandwidth determination may be performed for any voice-controlled device 106 that is associated with a user 104. Based at least in part on the determined bandwidth or amount of available bandwidth, the remote computing resource(s) 116 may determine whether the voice-controlled device 106 or the remote computing resource(s) 116 should process the audio signal(s).

The bandwidth or available bandwidth associated with the network 118 may be performed in any number of ways. In certain embodiments, when the voice-controlled device 106 is acquired (e.g., purchased, leased, etc.), the user 104 may specify the bandwidth of the network 118 that will be communicatively coupled to the voice-controlled device 106. The user 104 may also specify the bandwidth of the network 118 while the voice-controlled device 106 is in use. In addition, the remote computing resource(s) 116 may continuously monitor the bandwidth of a particular network 118 over time or may periodically determine the bandwidth of the network 118 at certain times or intervals.

Block 506 illustrates determining that the amount of bandwidth is equal to or greater than a threshold. More particularly, the systems and processes described herein may determine a particular bandwidth or available bandwidth that determines whether the voice-controlled device 106 or the remote computing resource(s) 116 should process the audio signal(s). That is, it may be determined whether there is sufficient network bandwidth to transmit or stream the captured audio data from the voice-controlled device 106 to the remote computing resource(s) 116 for processing. Here, if the amount of available bandwidth of the network 118 is equal to or greater than the bandwidth threshold, there may be sufficient bandwidth that allows the captured audio data and/or a corresponding audio signal to be streamed to the remote computing resource(s) 116.

Block 508 illustrates providing, by the voice-controlled device, an audio signal that corresponds to the captured audio to the remote device. Provided that it is determined that the network 118 has sufficient bandwidth (e.g., the amount of bandwidth meets or exceeds the bandwidth threshold), the unprocessed audio signal(s) may be provided to (e.g., streamed, transferred, transmitted, etc.) the remote computing resource(s) 116 for processing.

Block 510 illustrates processing, by the remote device, the audio signal. Upon receiving the processed audio signal(s), the remote computing resource(s) 116 may process the audio signal(s), such as by performing beamforming, echo cancellation, noise reduction, VAD, speech recognition, etc. with respect to the audio signal(s). For example, the remote computing resource(s) 116 may select a particular one of the audio signals to process, and then reduce the amount of acoustic echo and/or noise associated with that audio signal. Subsequently, the remote computing resource(s) 116 may determine one or more words that are represented within the audio signal.

Block 512 illustrates determining that the amount of bandwidth is less than the threshold. On the other hand, if it is determined that the bandwidth or the amount of available bandwidth is less than the bandwidth threshold, the voice-controlled device 106 may not stream the unprocessed audio signal(s) to the remote computing resource(s) 116 and, instead, may itself process the audio signal(s). In these embodiments, the amount of available bandwidth may not be sufficient to actually transfer the captured audio data and/or the audio signal(s). In other embodiments, the unprocessed audio signals may be transferred to the remote computing resource(s) 116, but the transfer may be very slow or transferring the data may negatively impact the performance of the voice-controlled device 106, which may result in a poor user experience.

Block 514 illustrates processing, by the voice-controlled device, the audio signal. More particularly, in response to determining that the bandwidth is insufficient to transfer the captured audio data and/or the corresponding audio signal(s) to the remote computing resource(s) 116, the voice-controlled device 106 may process the audio signal(s) by performing beamforming, echo cancellation, noise reduction, VAD, speech recognition, etc., with respect to the audio signal. As a result, the processing of the audio signals may be dependent upon the bandwidth of a network 118 associated with each voice-controlled device 116.

Figure 6:
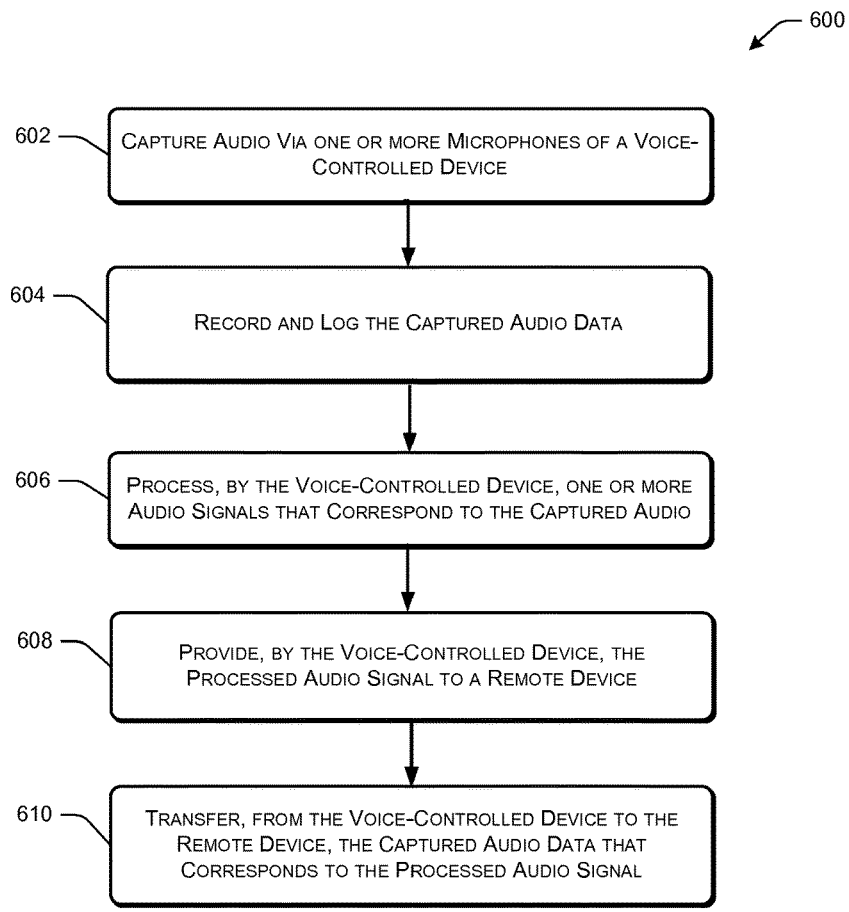
FIG. 6 shows a flow diagram of an example process for processing audio signals at a voice-controlled device while asynchronously transmitting the unprocessed audio signals to a remote device.

FIG. 6 shows an illustrative flow diagram 600 for asynchronously transferring audio data from a voice-controlled device to a remote device after a corresponding audio signal has been processed. The voice-controlled device 106, the remote computing resource(s) 116, or a combination of the two, may perform some or all of the following operations.

Block 602 illustrates capturing audio via one or more microphones of a voice-controlled device. In particular, multiple microphones 108 of the voice-controlled device 106 may capture audio within a physical space, where a different audio signal is associated with, or generated by, each of the microphones 108.

Block 604 illustrates recording and logging the captured audio data. In addition to capturing the audio data, the voice-controlled device 106 may store and log the raw audio data, which may include storing any information associated with the audio data (e.g., a time stamp, a location in which the audio was captured, a size, duration, etc.). In some embodiments, the audio signals that are representative of the captured audio data may be stored and logged. As a result, any user interactions with the voice-controlled device 106 may be cached and logged on that particular voice-controlled device 106. In various embodiments, the voice-controlled device 106 may store and log all of the captured audio data, random samples of the captured audio data, or samples of the captured audio data that are taken at predetermined times or intervals. Furthermore, the logged audio data may correspond to audio captured by some or all of the microphones 108 of the voice-controlled device 106.

In some embodiments, the audio data (e.g., unprocessed audio signal(s)) that is selected to be cached, logged, and/or streamed by the voice-controlled device 106 may be based on any number of factors. For example, the selection of the audio data may be based on the confidence level or accuracy of the speech recognition performed by the remote-computing resource(s) 116, differences between the selected audio data and non-selected audio data, identification of the speaker that corresponds to the selected sample of audio data, the number of different speakers detected in the selected sample of audio data, the signal-to-noise ratio detected in the selected sample of the audio data, unusual or previously non-detected types of noise in the selected sample of the audio data, and/or the type or amount of echo associated with the corresponding audio signal(s).

Block 606 illustrates processing, by the voice-controlled device, one or more audio signals that correspond to the captured audio. In response to capturing the audio data, the voice-controlled device 106 may process corresponding audio signals, such as by performing beamforming, echo cancellation, noise reduction, VAD, speech recognition, etc., with respect to the audio signal(s).

Block 608 illustrates providing, by the voice-controlled device the processed audio signal to a remote device. In various embodiments, the processed audio signal may be provided from the voice-controlled device 106 to the remote computing resource(s) 116. The remote computing resource(s) 116 may further process the audio signal(s) and/or perform VAD or speech recognition with respect to the processed audio signal(s). As stated above, the processed audio signal(s) may be compressed prior to being transferred, which may be dependent upon the bandwidth of a network 118 utilized to transfer the processed audio signals.

Block 610 illustrates transferring, from the voice-controlled device to the remote device, the captured audio data that corresponds to the processed audio signal. In various embodiments, at least a portion of the unprocessed audio signals that were previously stored and logged by the voice-controlled device 106 may be streamed to the remote computing resource(s) 116. More particularly, the audio signals that are streamed to the remote computing resource(s) 116 may correspond to the processed audio signal(s) that were previously provided. The transfer is asynchronous because the unprocessed audio signals are provided to the remote computing resource(s) 116 after the processed audio signals are provided to the remote computing resource(s) 116. The audio data that is asynchronously streamed to the remote computing resource(s) 116 may also be specifically associated with its corresponding audio signals, such that the source of the audio signals is known.

Moreover, the logged audio data may be streamed to the remote computing resource(s) 116 at a slower rate (e.g., a rate slower than a rate at which the audio signal was provided to the remote computing resource(s) 116), which may allow the voice-controlled device 106 to send the logged audio data without negatively affecting the performance of the voice-controlled device 106 or of other devices on the same. That is, certain users 104 may not have adequate bandwidth to stream the unprocessed audio data to the remote computing resource(s) 116 in real-time. Therefore, the logged audio data may be trickled (e.g., sent at a lower rate) from the voice-controlled device 106 to the remote computing resource(s) 116 at a later time (e.g., after the audio data is captured and processed by the voice-controlled device 106).

By logging and asynchronously transferring the captured audio data, the remote computing resource(s) 116 may have access to the raw audio data, the resulting processed audio data, how the audio data was processed, and any speech recognition performed with respect to the processed audio signal. This may enable experimentation and the application of machine learning techniques that may allow for improvements of the audio signal processing on the voice-controlled device 106. Any improvements may then be deployed in software that is updated, via the network 118, to the voice-controlled device 106. As a result, the voice-controlled device 106 may more accurately and efficiently process audio signals and increase its responsiveness to user requests.

More particularly, the remote computing resource(s) 116 may receive raw unprocessed audio data for a large number of voice-controlled devices 106, where the audio data may be time-stamped and specific to each particular device 106. In addition, the remote computing resource(s) 116 may also be aware of the particular algorithms and processes that are running on each voice-controlled device 106. As a result, the remote computing resource(s) 116 may utilize this information to improve the processing performed by the voice-controlled devices 106 and/or the remote computing resource(s) 116.

For example, for a particular sample of audio data for a specific voice-controlled device 106, an audio signal that corresponds to the audio data may initially be processed and speech recognition techniques may be applied thereto. That is, the word(s) that are represented within that audio signal may be determined. Since the raw audio data is now accessible, the same audio signal(s) may again be processed utilizing different or modified processes or algorithms. The remote computing resource(s) 116 may then obtain a second processed audio signal and perform speech recognition with respect to that second audio signal. As a result, by comparing the processed audio signals and the words that correspond to those audio signals, the remote computing resource(s) 116 may determine whether the performance or accuracy of the audio signal processing and speech recognition has improved. This process may be repeated utilizing different processes/algorithms for the purpose of identifying which audio signal processes, algorithms, and/or components are the most successful. This testing and experimentation may be performed prior to any modifications are made to the voice-controlled device 106.

Moreover, streaming the unprocessed audio data to the remote computing resource(s) 116 may provide the opportunity to select, deselect, develop, or modify algorithms used to process audio signals while the voice-controlled devices 106 are currently in use. Therefore, the overall performance of the voice-controlled device 106 may be improved on an ongoing basis without any interruption in service with respect to the user 104 of the voice-controlled device 106 and without negatively affecting the latency associated with the voice-controlled device 106. Moreover, the unprocessed audio data may also be utilized to modify or develop data compression techniques (e.g., algorithms) that may be utilized to compress the audio data prior to being streamed to the remote computing resource(s) 116. Higher performing compression techniques may enable the voice-controlled device 106 to send the raw audio data to the cloud in real-time, or near real-time, as opposed to sending the data at a lower rate after the raw audio data has been processed.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a microphone configured to capture sound from a sound source within an environment and generate a first audio signal and a second audio signal based at least in part on data associated with the sound;
   memory;
   one or more processors;
   one or more computer executable instructions stored in the memory and executable by the one or more processors to:
      at least partially process the first audio signal, wherein partially processing the first audio signal reduces at least one of noise or echo from the data;
      send, to a remote device and at a first rate, the first audio signal; and
      send, to the remote device and at a second rate that is different than the first rate, the second audio signal, the second audio signal having been processed different than the first audio signal; and
   the remote device being configured to:
      perform speech recognition on the first audio signal based at least in part on an algorithm, the speech recognition including determining one or more words associated with the first audio signal;
      perform speech recognition on the second audio signal based at least in part on an updated algorithm that is based at least in part on the algorithm; and
      determine whether a first accuracy of speech recognition utilizing the updated algorithm is greater than a second accuracy of speech recognition utilizing the algorithm.

2. The system as recited in claim 1, wherein the one or more computer-executable instructions are further executable by the one or more processors to receive an indication that the algorithm has been selected, deselected, or modified or that the updated algorithm has been implemented, the algorithm or the updated algorithm being utilized to process subsequent audio signals.

3. The system as recited in claim 1, wherein the second rate is slower than the first rate.

4. The system as recited in claim 1, wherein the one or more computer-executable instructions are further executable by the one or more processors to log the at least the first portion of the first audio signal or the at least the second portion of the second audio signal, the logging including recording a time stamp, a size, or a duration of the first audio signal or the second audio signal or a location at which the first audio signal or the second audio signal was captured.

5. The system as recited in claim 1, wherein the one or more computer-executable instructions are further executable by the one or more processors to select the first audio signal or the second audio signal by determining a loudness of a sound source or a voice included within the first audio signal and the second audio signal.

6. A method comprising:
   receiving, during a first time period, at a first rate, and from a device associated with a microphone, a first audio signal generated based at least in part on data received from the microphone, the first audio signal corresponding to sound that is associated with a sound source, the first audio signal having been at least partially processed by the device to reduce at least one of noise or echo from the data;
   receiving, from the device, during a second time period that is subsequent to the first time period, and at a second rate that is slower than the first rate, a second audio signal, the second audio signal corresponding to the sound detected by the microphone and having been processed, by the device, different than the first audio signal;
   based at least in part on receiving the second audio signal, generating an updated algorithm associated with an algorithm used to process subsequent audio signals;
   performing speech recognition on the first audio signal based at least in part on the algorithm, the speech recognition including determining one or more words associated with the first audio signal;
   performing speech recognition on the second audio signal based at least in part on the updated algorithm; and
   determining whether a first accuracy of speech recognition utilizing the updated algorithm is greater than a second accuracy of speech recognition utilizing the algorithm.

7. The method as recited in claim 6, further comprising:
   selecting one of the first audio signal or the second audio signal as a selected audio signal; and
   processing the selected audio signal by reducing background noise, reverberation, or acoustic echo in the selected audio signal.

8. The method as recited in claim 6, further comprising:
   determining that the first audio signal is received at the first rate; and
   determining that the second audio signal is received at the second rate, the second rate being dependent upon a bandwidth of a network utilized to transfer the second audio signal.

9. The method as recited in claim 7, further comprising at least one of:
   reducing, using the algorithm, noise in the selected audio signal; or
   determining, using the algorithm, one or more words that are associated with the selected audio signal.

10. The method as recited in claim 6, wherein the second audio signal is cached and logged on the device, the second audio signal being a sample of respective audio signals generated by the microphone.

11. The method as recited in claim 6, wherein updating the algorithm includes developing a new algorithm that is to be used to process the subsequent audio signals.

12. The method as recited in claim 6, wherein updating the algorithm includes at least one of modifying a value, variable, parameter, constant, or coefficient associated with the algorithm or determining a value, variable, parameter, constant, or coefficient associated with the algorithm.

13. The method as recited in claim 6, wherein updating the algorithm includes selecting or deselecting the algorithm.

14. A system comprising:
   memory;
   one or more processors; and
   one or more computer-executable instructions stored in the memory and executable by the one or more processors to perform operations comprising:
      receiving, during a first time period and from a device associated with a microphone, a first audio signal generated based at least in part on data received from the microphone, the audio signal corresponding to sound that is associated with a sound source, the first audio signal having been at least partially processed by the device to reduce at least one of noise or echo from the data;

receiving, during a second time period and from the device, a second audio signal, the second audio signal corresponding to the sound detected by the microphone and having been processed, by the device, different than the first audio signal;

based at least in part on receiving at least one of the first audio signal or the second audio signal, generating an algorithm used to process subsequent audio signal;

performing speech recognition on the first audio signal based at least in part on the algorithm, the speech recognition including determining one or more words associated with the first audio signal;

performing speech recognition on the second audio signal based at least in part on an updated algorithm that is based at least in part on the algorithm; and determining whether a first accuracy of speech recognition utilizing the updated algorithm is greater than a second accuracy of speech recognition utilizing the algorithm.

15. The system as recited in claim 14, wherein the operations further comprise:

selecting one of the first audio signal or the second audio signal as a selected audio signal; and processing the selected audio signal by reducing at least one of background noise, reverberation, or acoustic echo associated with the selected audio signal.

16. The system as recited in claim 15, wherein the operations further comprise:

determining a bandwidth of a network communicatively coupled to the device;

determining that the bandwidth at least one of meets or exceeds a bandwidth threshold; and processing the selected audio signal.

17. The system as recited in claim 15, wherein the operations further comprise:

determining a bandwidth of a network communicatively coupled to the device;

determining that the bandwidth is less than a bandwidth threshold; and instructing the device to process the selected audio signal.

18. The system as recited in claim 14, wherein the operations further comprise:

determining that the first audio signal is received at a first rate; and determining that the second audio signal is received at a second rate that is slower than the first rate.

19. The system as recited in claim 18, wherein the operations further comprise determining that the second rate is dependent upon a bandwidth of a network utilized to transfer the second audio signal.

20. A method comprising:

receiving, during a first time period and from a device associated with a microphone, a first audio signal generated based at least in part on data received from the microphone, the audio signal corresponding to sound that is associated with a sound source, the first audio signal having been at least partially processed by the device to reduce at least one of noise or echo from the data;

receiving, during a second time period and from the device, a second audio signal, the second audio signal corresponding to the sound detected by the microphone and having been processed, by the device, different than the first audio signal;

based at least in part on at least one of the first audio signal or the second audio signal, determining an algorithm used to process subsequent audio signals;

generating an updated algorithm based at least in part on the algorithm;

performing speech recognition on the first audio signal based at least in part on the algorithm, the speech recognition including determining one or more words associated with the first audio signal;

performing speech recognition on the second audio signal based at least in part on the updated algorithm; and determining whether a first accuracy of the speech recognition utilizing the updated algorithm is greater than a second accuracy of the speech recognition utilizing the algorithm.

21. The method as recited in claim 20, further comprising generating, based at least in part on an update to the algorithm, the updated algorithm.

22. The method as recited in claim 20, further comprising:

determining a bandwidth of a network communicatively coupled to the device;

determining that the bandwidth at least one of meets or exceeds a bandwidth threshold; and processing at least one of the first audio signal or the second audio signal.

23. The method as recited in claim 20, further comprising:

determining a bandwidth of a network communicatively coupled to the device;

determining that the bandwidth is less than a bandwidth threshold; and instructing the device to process at least one of the first audio signal or the second audio signal.

24. The method as recited in claim 6, further comprising:

determining that the first accuracy of speech recognition utilizing the updated algorithm is greater than the second accuracy of speech recognition utilizing the algorithm; and selecting the updated algorithm for subsequent processing of audio signals.

25. The method as recited in claim 24, further comprising performing, based at least in part on selecting the updated algorithm for subsequent processing of the audio signals, speech recognition on a third audio signal based at least in part on the updated algorithm.

* * * * *